United States Patent [19]
Takahashi

[11] Patent Number: 4,726,620
[45] Date of Patent: Feb. 23, 1988

[54] SUN VISOR FOR AUTOMOBILE

[76] Inventor: Taneyuki Takahashi, 34-9, Koshigoe 2-Chome, Kamakura-Shi, Kanagawa, Japan

[21] Appl. No.: 75,181

[22] Filed: Jul. 17, 1987

Related U.S. Application Data

[63] Continuation of Ser. No. 832,044, Feb. 20, 1986, abandoned.

[30] Foreign Application Priority Data

Feb. 28, 1985 [JP] Japan .............................. 60-28237[U]
Feb. 28, 1985 [JP] Japan .............................. 60-28238[U]

[51] Int. Cl.4 ............................................... B60J 3/00
[52] U.S. Cl. ................. 296/97 H; 296/97 F; 296/97 R
[58] Field of Search ................. 296/97 H, 97 R, 97 F, 296/97 C; 160/DIG. 3

[56] References Cited

U.S. PATENT DOCUMENTS 3,242,245 3/1966 Greig et al. ...................... 296/97 H

FOREIGN PATENT DOCUMENTS 2301839 7/1973 Fed. Rep. of Germany .... 296/97 C
2737215 6/1978 Fed. Rep. of Germany .... 296/97 R
2535385 10/1983 France .............................. 296/97 C Primary Examiner—Robert B. Reeves
Assistant Examiner—Carol L. Olson
Attorney, Agent, or Firm—James E. Nilles; Nicholas A. Kees

[57] ABSTRACT

A sun visor for use in an automobile wherein a perforated sheet which is either a sheet having all over its surface a large number of fine through holes through which it is possible to see or cloth of coarse texture with the marginal portion of the sheet being supported by a supporting frame which has an edging frame. The perforated sheet is provided around its periphery with engagement holes, the supporting frame is split into upper and lower sections wherein one of the split sections of the supporting frame has pegs and the other apertures, the pegs being fit to the apertures through the engagement holes.

5 Claims, 13 Drawing Figures

SUN VISOR FOR AUTOMOBILE

This application is a continuation of application Ser. No. 832,044, filed 2/20/86, now abandoned.

BACKGROUND OF THE INVENTION

1. Field of the Invention

The present invention relates to a sun visor for use in an automobile which is disposed at the front of the compartment of a car, i.e., above the windshield located in front of the driver's seat, and is lowered when the sun streams into the vehicle from the front end thereof so as to shield the driver's eyes from direct sunlight, as well as those of the passenger seated at his side.

2. Description of the Prior Art

A known automobile sun visor of this type is designed to shut out the sun's rays when they are shining into the compartment of a vehicle from the front, and is composed of a supporting frame made of steel wire or the like with a curved configuration and either a thin opaque sheet of synthetic resin such as vinyl chloride or cloth. The supporting frame is covered with the thin sheet or the cloth so that the frame is entirely surrounded thereby, and the driver or the passenger is thus unable to see through the sun visor at all.

The above-mentioned known sun visor for an automobile reduces substantially by half visibility in the direction of travel when it is lowered so as to screen sunlight shining through the front windshield of a vehicle, thereby making it difficult for the driver or the passenger to look through the windshield.

In consequence, when the known sun visor is used so as to shut out sunlight, it becomes both difficult and dangerous to drive a car. Also, such a sun visor causes the driver to easily become tired.

SUMMARY OF THE INVENTION

In view of the above-mentioned disadvantages, it is a primary object of the present invention to provide an automobile sun visor which comprises a perforated sheet which is either a sheet having all over its surface a large number of fine through holes or coarse-textured cloth, through which it is possible to see, and a frame over which the sheet is extended, the supporting frame being mounted to a car body by securing one end thereof to a mounting member of the car in such a manner that it can be swung upwardly and downwardly.

It is another object of the present invention to provide an automobile sun visor which comprises a perforated sheet which is either a sheet having a large number of minute through holes all over its surface through which a forward view can be obtained or coarse-textured cloth, and a two-section supporting frame made of synthetic resin to which the sheet is secured by being gripped at the peripheral edge thereof between its upper and lower frame sections, the supporting frame being mounted on a car body by securing one end thereof to a mounting member of the body in such a manner that it can be swung upwardly and downwardly.

When the automobile sun visor of the present invention is lowered by being swung downwardly when the sun's rays stream into a car from the front end thereof, it is capable of shutting out the greater part of the direct sunlight entering the compartment of the vehicle from the front, just as the conventional sun shade is, and the driver and the passenger seated at his side are not dazzled by the glare of the light.

On the other hand, the sun visor of the present invention also makes it possible for the driver and the passenger to have a forward view through the large number of very small through holes provided in the perforated sheet of the sun visor.

The above and other objects and features of the present invention will be apparent from the following description, reference being made to the accompanying drawings wherein preferred embodiments of the present invention are clearly shown.

DESCRIPTION OF THE PREFERRED EMBODIMENTS

Figure 1:
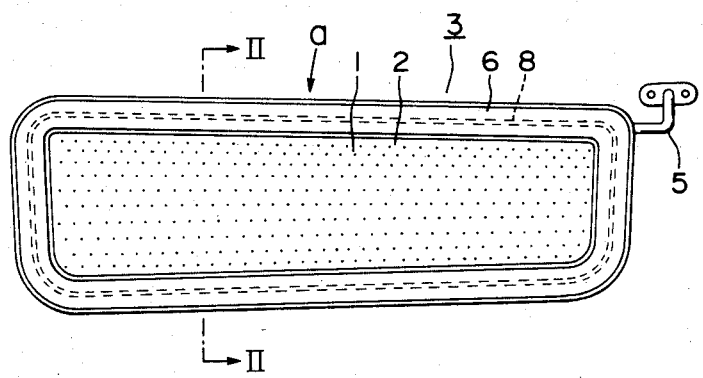
FIG. 1 is a rear view of an embodiment of an automobile sun visor according to the present invention.

FIGS. 1 to 4 show an embodiment of the invention which will be described hereinunder with reference to the drawings. A perforated sheet 2 is made of either a synthetic resin such as vinyl chloride or the like or wood and has a large number of minute through holes 1 formed therein. Alternatively, the sheet 2 is made of cloth of coarse texture, holes in which act in a similar manner as the large number of fine through holes 1. The reference numerals 3 and 6 respectively denote a supporting frame and a frame covering which is made of vinyl chloride or other synthetic resin, or cloth, while the reference numeral 7 designates a frame body of the supporting frame 3 which is made of a semi-rigid polyurethane or other synthetic resin foam having a core material 8 in its center. The core material 8 is made of steel wire or the like and is bent so as to conform to the configuration of the frame body 7.

Figure 2:
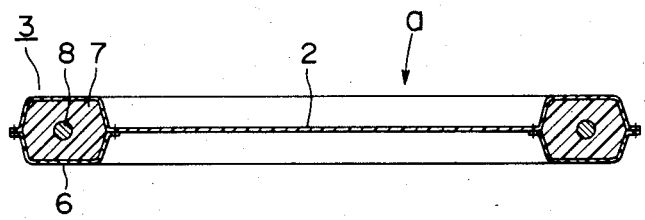
FIG. 2 is a sectional view taken along the line II—II of FIG. 1.
Figure 3:
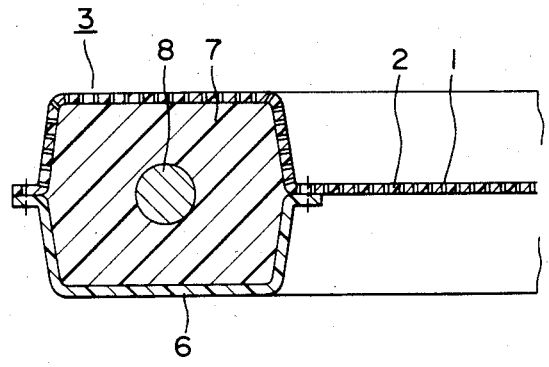
FIG. 3 is an enlarged side and sectional view of a part of the sun visor shown in FIG. 2.

As shown in FIG. 2, the perforated sheet 2 and the frame covering 6 are attached to the upper half and the lower half portions of the frame body 7, respectively, so that the frame body 7 is covered by the peripheral edge portions of the perforated sheet 2 and the frame covering 6. The frame covering 6 and the perforated sheet 2 are then secured at the outer and inner edges of the frame covering 6 by means of high-frequency welding or sewing such as to construct a sun visor a.

One end of the supporting frame 3 of the sun visor a is mounted on a member 5 in such a manner that it can be moved upwardly and downwardly.

Figure 4:
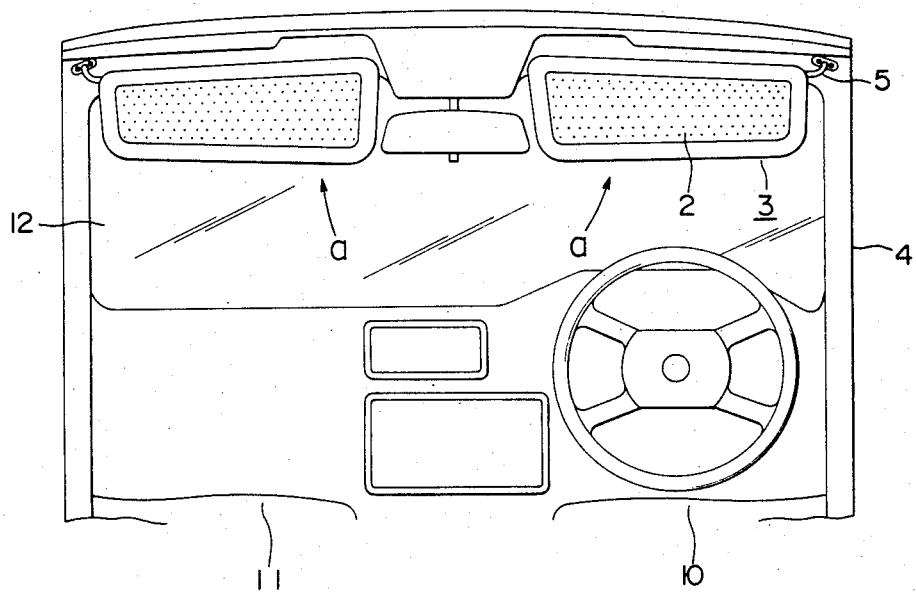
FIG. 4 is a rear view showing the above-mentioned sun visor mounted on a car body.

The reference numerals 10 and 11 in FIG. 4 indicate a driver's seat and a passenger's seat located at the front of the compartment of a car. The reference numeral 12 denotes a windshield.

Figure 5:
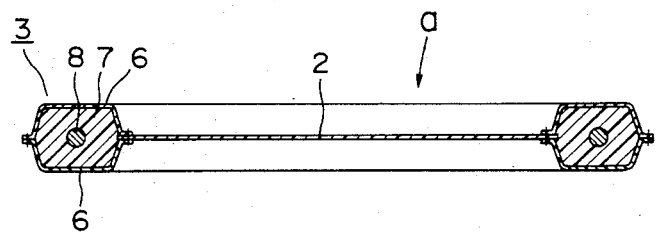
FIG. 5 is a side and sectional view of another embodiment of an automobile sun visor according to the present invention.
Figure 6:
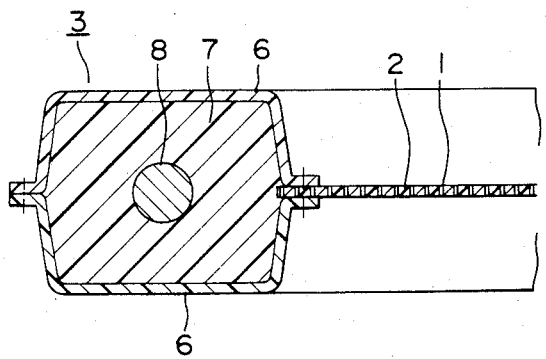
FIG. 6 is an enlarged side and sectional view of a part of the sun visor shown in FIG. 5.

FIGS. 5 and 6 show another embodiment of the present invention, in which the peripheral edge of the perforated sheet 2 reaches and is fitted into the inner edge of the frame body 7.

As shown in FIG. 5, the frame covering 6 is attached to the upper and lower halves of the frame body 7 so that the frame body is covered by the frame covering 6. The peripheral edge of the perforated sheet 2 is placed between the inner edges of the frame covering 6, 6, and the outer edges of the frame covering 6, 6 as well as the inner edges of the frame covering 6, 6 and the peripheral edge of the perforated sheet 2 are respectively secured by high-frequency welding or sewing so as to construct the sun visor a.

Figure 7:
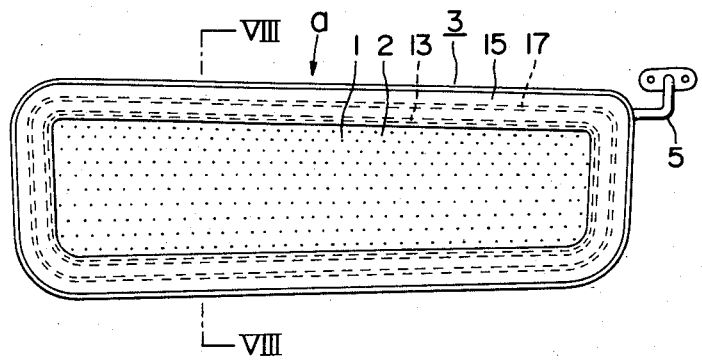
FIG. 7 is a rear view of still another embodiment of an automobile sun visor according to the present invention.
Figure 8:
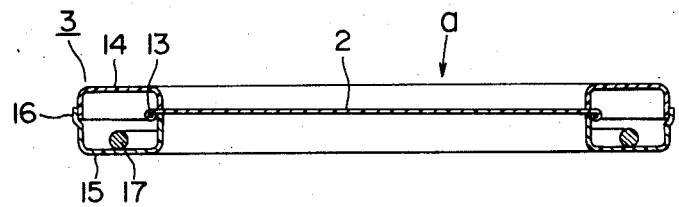
FIG. 8 is a sectional view taken along the line VIII—VIII of FIG. 7.
Figure 9:
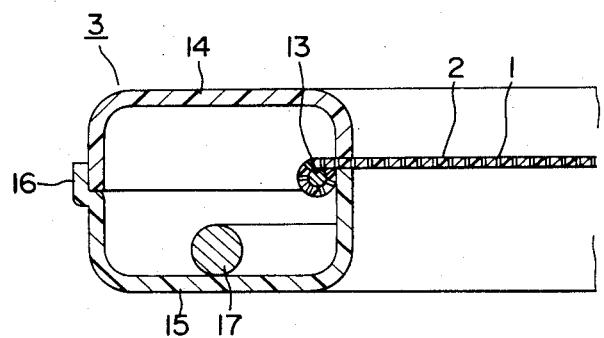
FIG. 9 is an enlarged side and sectional view of a part of the sun visor shown in FIG. 8.
Figure 10:
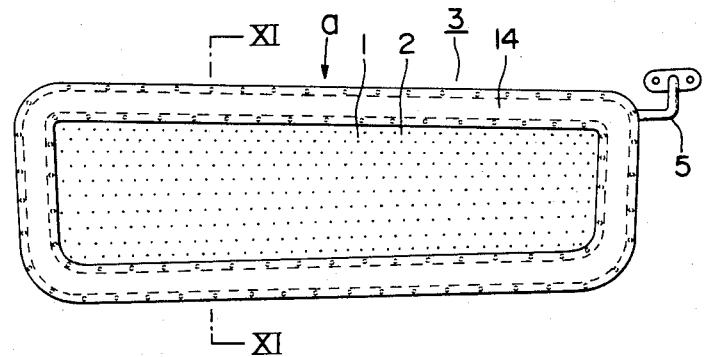
FIG. 10 is a rear view of still another embodiment of an automobile sun visor according to the present invention.

FIGS. 7 to 9 show still another embodiment of the present invention, in which the peripheral edge portion of the perforated sheet 2 extends into a hollow interior of the frame body 7, and is wound around an edging frame 13 made of steel wire or the like.

The supporting frame 3 which includes upper and lower frame sections 14, 15, is made of a resin material. The resin material, which is a thermosetting or thermoplastic resin mixed with wood fiber, wood flour, talc or the like, is further mixed with reinforcing resin or inorganic reinforcement, and is then molded into the frame 3. The frame 3 may be reinforced by having a core material made of steel wire or the like incorporated therein.

The cross-sectional configurations of the upper and lower frame sections 14, 15 are in the shape of an inverted "U" and a "U", respectively, and are disposed in opposition to each other. The lower frame section 15 is provided at the upper end of its outer portion with a supporting edge 16 which extends outwardly. The reference numeral 17 designates a frame reinforcing rod which is fixed along the center line of the bottom face within the lower frame section 15, and is made of steel wire or the like.

As shown in FIG. 8, the edging frame 13 provided at the peripheral edge of the perforated sheet 2 is hung on the upper edge of the inner portion of the lower frame section 15, and the upper frame section 14 is placed on the lower frame section 15 by fitting the upper frame section 14 within the supporting edge 16 of the lower frame section 15 so that the peripheral edge portion of the perforated sheet 2 is gripped between the inner portions of the upper and lower frame sections 14, 15. The outer portions of the upper and lower frame sections 14, 15 are then secured by means of an adhesive (not shown in the drawings) so as to construct the sun visor a.

FIGS. 10 to 13 show still another embodiment of the present invention. In this embodiment, the peripheral edge of the perforated sheet 2 substantially reaches the outer periphery of the two-section synthetic resin supporting frame 3. The perforated sheet 2 has a large number of engagement holes 18 formed around its periphery in two parallel lines forming an inner row and an outer row and spaced from each other at adequate intervals. The two-section synthetic resin supporting frame 3 is formed in opposing pieces which respectively have the cross-sectional shapes of an inverted "U" and a "U". A large number of pegs 19 are provided on the upwardly facing surfaces of the inner and outer portions of the lower frame section 15 along the center lines thereof, these pegs being disposed at suitable intervals from each other. A similar number of apertures 20 for mating with the pegs 19 are provided in a similar manner on the downwardly facing surfaces of the inner and outer portions of the upper frame section 14 along the center lines thereof.

Figure 11:
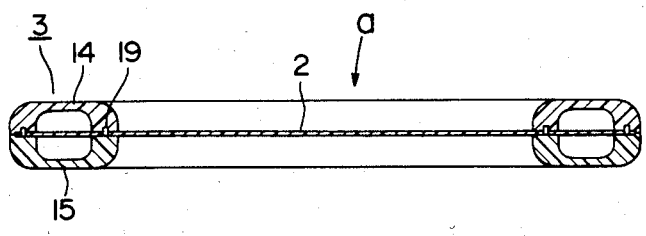
FIG. 11 is a sectional view taken along the line XI—XI of FIG. 10.
Figure 12:
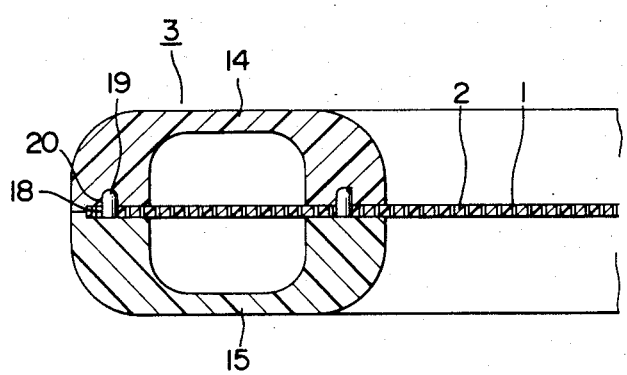
FIG. 12 is an enlarged side and sectional view of a part of the sun visor shown in FIG. 11.
Figure 13:
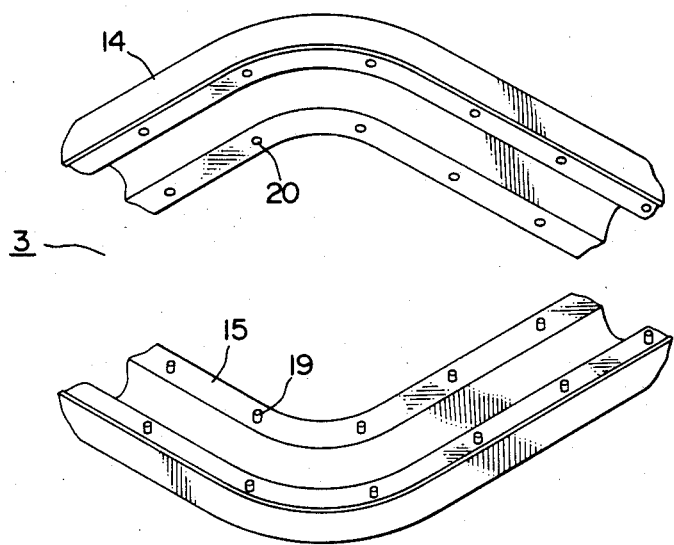
FIG. 13 is an exploded perspective view of a part of a two-section supporting frame.

As shown in FIG. 11, the engagement holes 18 of the perforated sheet 2 are mated with the pegs 19 provided on the lower frame section 15, and then the apertures 20 provided in the upper frame section 14 are also mated with them so that the peripheral edge portion of the perforated sheet 2 is gripped between the upper and lower frame sections 14, 15. Then, both the frame sections and the perforated sheet are secured together by means of an adhesive (not shown in the drawings) so as to construct the sun visor a.

With the above-mentioned arrangement, the automobile sun visor of the present invention ensures the following distinct advantages.

(1) It is able to screen the greater part of the direct sunlight entering the compartment of a car from the front on being lowered when the sun's rays stream into the car from the front end thereof, thus preventing the driver and the passenger seated by his side from being blinded by the sunlight.

(2) It is possible for the driver and the passenger to have a forward view through a large number of very small through holes provided in the perforated sheet of the sun visor.

Therefore, even when sunlight comes into the compartment of a car from the front end thereof during travel, visibility in the direction of travel is to some extent ensured, thus improving driving safety.

(3) The greater part of the sun visor is made of a thin perforated sheet which enables a good forward view through a large number of fine through holes provided thereon.

(4) The sun visor is constructed by extending the perforated sheet within the supporting frame, by means of which it is given a durable structure.

(5) The upper and lower frame sections of the split synthetic resin supporting frame can be mass-produced by molding of synthetic resin. On the other hand, in the case of embodiments in which the perforated sheet is secured by being gripped at its peripheral edge portion between the upper and lower frame sections of the split supporting frame, it may be easily and quickly manufactured, increasing working efficiency.

(6) The perforated sheet and upper and lower frame sections of the split supporting frame can be assembled separately, which is convenient for handling.

(7) With a simple structure, it can be easily produced at a low cost, while at the same time its parts may be firmly fixed to one another.

What is claimed is:

1. A sun visor for an automotive vehicle comprising:
A. a sheet of substantially opaque material having peripheral edges which surround a central portion thereof, and having in said central portion numerous small closely spaced holes through which objects can be seen but which permit light to pass through the sheet only with substantially reduced intensity; and B. a substantially rigid supporting frame secured to said peripheral edges of the sheet and surrounding said central portion to maintain said central portion in substantially flat condition and provide for swingable connection of the sheet to a vehicle structure whereby the sheet can be moved to and from an operative position overlying an inner surface of a windshield, said rigid supporting frame comprising:

1. a wire edging frame around which said peripheral edges of the sheet are wound;
2. an upper frame section having the cross-sectional shape of an inverted "U" and a lower frame section having the cross-sectional shape of a "U", each section having an inner portion and an outer portion, said sections overlying opposite surfaces of the sheet, each section extending around said peripheral edges of the sheet and secured to one another by securing means, with said peripheral edges of the sheet clampwise confined between the inner portion of the upper section and the inner portion of the lower section, said wire edging frame being positioned between said inner and outer portions of said sections, and in contact with said inner portion, with said sheet being hung on the inner portion of the lower section.

2. A sun visor as recited in claim 1 wherein said securing means includes a supporting edge provided to the outer portion of the upper section, which supporting edge extends outwardly from the portion for placement therein of the outer portion of the upper section.

3. A sun visor as recited in claim 1 wherein said lower section includes a lower face connecting the two portions thereof, and further comprising a frame reinforcing rod fixed along the center of said bottom face.

4. The sun visor of claim 1 wherein said sheet is of opaque synthetic plastic.

5. The sun visor of claim 1 wherein said sheet is of coarse-textured cloth.

* * * * *